United States Patent
Nebres, Jr.

(10) Patent No.: US 7,143,107 B1
(45) Date of Patent: Nov. 28, 2006

(54) REPORTING ENGINE FOR DATA WAREHOUSE

(75) Inventor: Diosdado L. Nebres, Jr., Redmond, WA (US)

(73) Assignee: Microsoft Corporation, Redmond, WA (US)

(*) Notice: Subject to any disclaimer, the term of this patent is extended or adjusted under 35 U.S.C. 154(b) by 465 days.

(21) Appl. No.: 10/606,720

(22) Filed: Jun. 26, 2003

(51) Int. Cl.
G06F 17/00 (2006.01)

(52) U.S. Cl. .......................... 707/103 R; 707/3; 707/4; 707/5; 715/500

(58) Field of Classification Search ............... 707/3, 707/4, 6, 10, 2, 100, 101, 1, 200, 102; 715/505
See application file for complete search history.

(56) References Cited

U.S. PATENT DOCUMENTS

| | | | |
|---|---|---|---|
| 5,201,047 A | 4/1993 | Maki et al. | |
| 5,590,324 A | 12/1996 | Leung et al. | |
| 5,692,181 A * | 11/1997 | Anand et al. | 707/102 |
| 5,822,751 A | 10/1998 | Gray et al. | |
| 6,047,284 A * | 4/2000 | Owens et al. | 707/4 |
| 6,105,043 A * | 8/2000 | Francisco et al. | 715/513 |
| 6,134,564 A * | 10/2000 | Listou | 715/505 |
| 6,269,368 B1 * | 7/2001 | Diamond | 707/6 |
| 6,356,906 B1 * | 3/2002 | Lippert et al. | 707/10 |
| 6,442,560 B1 * | 8/2002 | Berger et al. | 707/102 |
| 6,473,750 B1 * | 10/2002 | Petculescu et al. | 707/3 |
| 6,502,089 B1 * | 12/2002 | Amundsen et al. | 707/2 |
| 6,507,835 B1 | 1/2003 | Amundsen et al. | |
| 6,535,874 B1 * | 3/2003 | Purcell | 707/3 |
| 6,542,893 B1 * | 4/2003 | Quernemoen | 707/100 |
| 6,549,907 B1 * | 4/2003 | Fayyad et al. | 707/101 |
| 6,564,204 B1 | 5/2003 | Amundsen et al. | |
| 6,574,623 B1 | 6/2003 | Leung et al. | |
| 6,581,052 B1 | 6/2003 | Slutz | |
| 2003/0028550 A1 * | 2/2003 | Lee et al. | 707/200 |
| 2004/0139043 A1 * | 7/2004 | Lei et al. | 707/1 |

OTHER PUBLICATIONS

Wyss et al., "A Relational Algebra for Data/Metadata Integration in a Federated Database System," Proceedings of the Tenth International Conference on Information and Knowledge Management, 2001, pp. 65-72, ACM Press, New York, U.S.A.

Jones, "An Introduction to Data Warehousing: What Are the Implications for the Network?," International Journal of Network Management, Jan.-Feb. 1998, vol. 8, Issue 1, pp. 42-56, John Wiley & Sons, Inc., New York, U.S.A.

(Continued)

*Primary Examiner*—Sam Rimell
*Assistant Examiner*—Paul Kim
(74) *Attorney, Agent, or Firm*—Senniger Powers

(57) ABSTRACT

A reporting engine for generating customized reports from relational data stored in a database. Metadata associated with the data in the database describes the data according to one or more characteristics of the data. One or more of tables organizing the metadata is exposed as a dimension having at least one column of attributes. The reporting enging compares search criteria, specified by a request from a user, to the metadata attributes, and executes a predefined procedure for retrieving selected data from the database. The procedure constructs a query as a function of the comparison between the search criteria and the metadata attributes for implementing the query to optimize retrieval of the selected data from the database. Other aspects of the invention are directed to computer-readable media for use in connection with the reporting engine.

49 Claims, 4 Drawing Sheets

OTHER PUBLICATIONS

Rahm et al., "A Survey of Approaches to Automatic Schema Matching," The VLDB Journal—The International Journal on Very Large Data Bases, Dec. 2001, vol. 10, Issue 4, pp. 334-350, Springer-Verlag New York, Inc., Secaucus, New Jersey, U.S.A.

Lakshmanan et al., "SchemaSQL: An Extension to SQL for Multidatabase Interoperability," ACM Transactions on Database Systems (TODS), 2001, vol. 26, Issue 4, pp. 476-519, ACM Press, New York, U.S.A.

Babcock et al., "Dynamic Sample Selection for Approximate Query Processing," Proceedings of the 2003 ACM SIGMOD International Conference on Management of Data, 2003, pp. 539-550, ACM Press, New York, U.S.A.

Lipton et al., "Query Size Estimation by Adaptive Sampling (extended abstract)," Proceedings of the Ninth ACM SIGACT-SIGMOD-SIGART Symposium on Principles of Database Systems, 1990, pp. 40-46, ACM Press, New York, U.S.A.

* cited by examiner

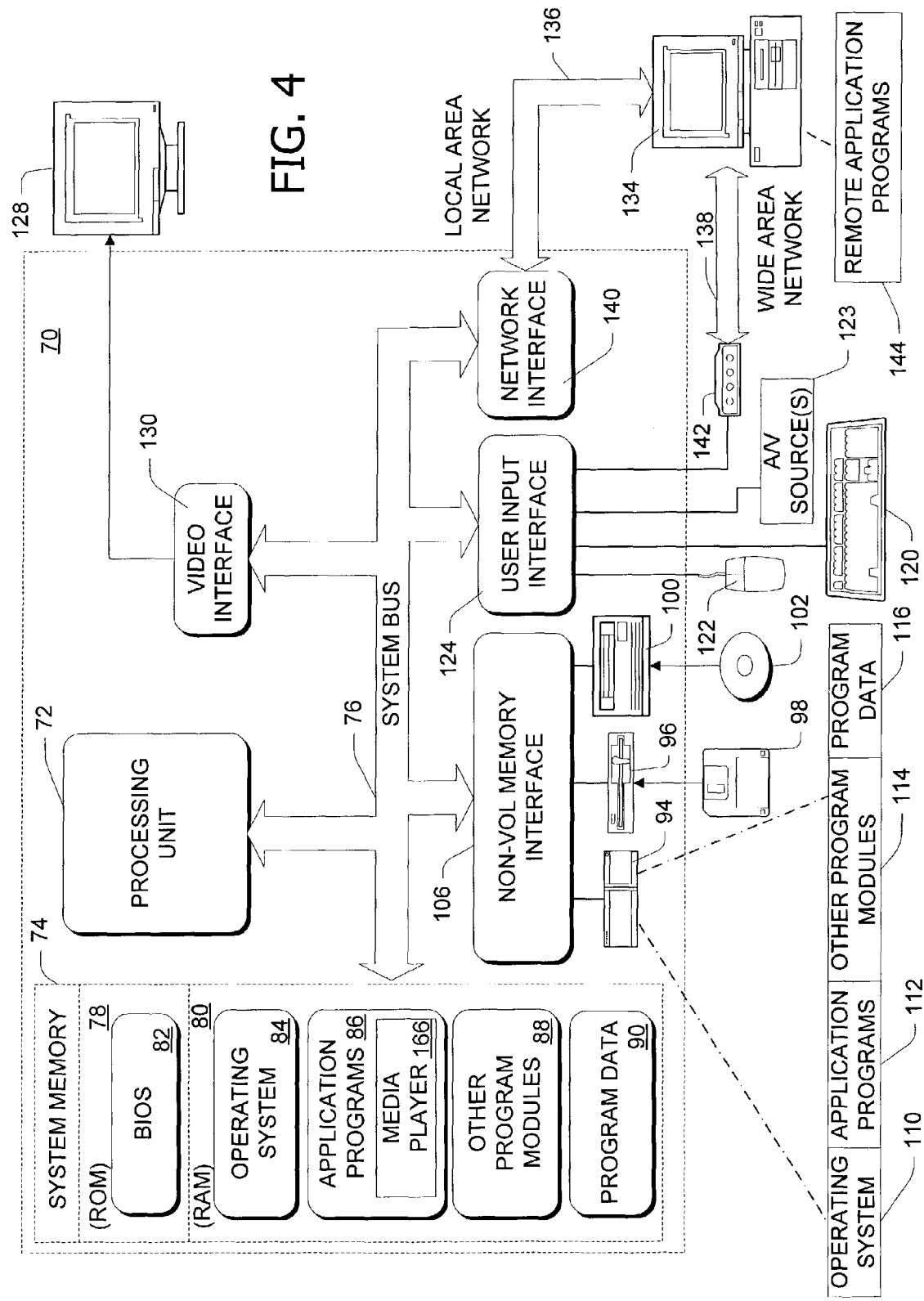

REPORTING ENGINE FOR DATA WAREHOUSE

TECHNICAL FIELD

Embodiments of the present invention relate to the field of reporting information services. In particular, embodiments of this invention relate to a reporting engine for constructing queries for a data warehouse.

BACKGROUND OF THE INVENTION

Processing large volume data often presents usability, manageability, and scalability problems. As an example, Web sites generate gigabytes of data every day to describe actions made by visitors to the sites. In fact, the average number of hits on a popular network of Web sites can reach 1.5 billion hits per day or more. This data has several dimensions, such as where each visitor came from, the time of day, the route taken through the site, and the like. Moreover, the amount of data continually increases as the number of Web services and the amount of business they conduct increases. Processing the large amount of data to produce meaningful usage reports and clickstream analysis for a network of sites involves overcoming several challenges.

In general, data warehouses are databases designed to support decision-making in an organization. The data is usually historical and static and may also contain numerous summaries. Typical data warehouses are batch updated on a periodic basis and contain vast amounts of data in relational tables summarized at different levels to improve query performance. Data warehouses are structured to support a variety of analyses, including elaborate queries on large amounts of data that can require extensive searching. In a typical data warehouse, fact tables contain the actual numeric metrics, such as a count of page views, that a user might be interested in viewing.

Fact tables usually have a plurality of foreign keys that relate to primary keys in dimension tables. This allows individual records of a fact table to be indexed or matched up to specific dimensional values. That is, given a set of dimensional values, corresponding metrics can be located. In the example above, a user wishes to view data from the page views fact table. For example, a domain dimension table allows the user to choose a single domain, and then see only the data from the page views fact table that corresponds to that target domain. Similarly, the time dimension allows the user to choose a single day and view only the data from the page views fact table that corresponds to the chosen target domain and the chosen date. Choosing the dimensions across which a user wants data to be summarized may be referred to as slicing the data. A definition of the relationship between tables in a data warehouse is usually called a schema.

Known reporting techniques involve creating heavily customized structured query language (SQL) statements for generating reports to answer a user's queries. Unfortunately, new customized procedures of this type are needed each time new report requirements arise. This leads to higher cost and greater development effort and results in less flexibility in how reports are produced.

Accordingly, a reporting engine is desired to address one or more of these disadvantages.

SUMMARY OF THE INVENTION

Embodiments of the invention overcome one or more deficiencies in the prior art by providing, among other things, a reporting engine for generating reports in response to database queries.

In at least one embodiment, the reporting engine has a metadata layer describing aspects of the data in a dataware-house, relatively simple query syntax, and a mechanism for matching the query to the metadata so a set of query language statements can be constructed in a resource efficient manner for implementing the query. This greatly reduces the need for customized code and the development time needed to expose data warehouse relational data in a flexible and generic manner. Thus, embodiments of the invention make existing data in relational tables more accessible to ad hoc queries through a simplified interface without sacrificing performance.

Moreover, the features of the present invention described herein are less laborious and easier to implement than currently available techniques as well as being economically feasible and commercially practical.

Briefly described, a method embodying aspects of the invention generates a customized report from relational data stored in a database. The method includes providing metadata associated with the data in the database. The metadata describes the data according to one or more characteristics of the data. The method also includes receiving a request for information from a user and executing a predefined procedure for retrieving selected data from the database in response to the request for information. The procedure constructs a query as a function of the characteristics of the data as described by the metadata for optimizing retrieval of the selected data.

In another embodiment, a method of constructing a query embodies aspects of the invention. The method permits retrieving selected data from a database in response to a request from a user for information. The method includes defining metadata to describe data in the database according to one or more characteristics of the data. The method also includes defining a plurality of tables for organizing the metadata relative to the data. One or more of the tables is exposed as a dimension having at least one column of attributes. The method further includes comparing search criteria specified by the request for information to the metadata attributes and executing a predefined procedure in response to the request for information. The procedure generates a set of structured query language (SQL) statements as a function of the comparison between the search criteria and the metadata attributes for implementing the query to optimize retrieval of the selected data from the database.

Yet another embodiment of the invention is directed to one or more computer-readable media that has computer-executable components for generating a report from data stored in a database. The computer-readable media includes a metadata component for describing the data in the database according to one or more characteristics of the data and an interface component for receiving a request for information from a user. The computer-readable media also includes a procedure component responsive to the request for information for constructing a query to retrieve selected data from the database. The procedure component constructs the query as a function of the characteristics of the data as described by the metadata component for optimizing retrieval of the selected data.

Computer-readable media having computer-executable instructions for performing methods of sharing information embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 4 is a block diagram illustrating exemplary components of a computer for use with the invention.

Corresponding reference characters indicate corresponding parts throughout the drawings.

DETAILED DESCRIPTION OF THE INVENTION

Figure 1:
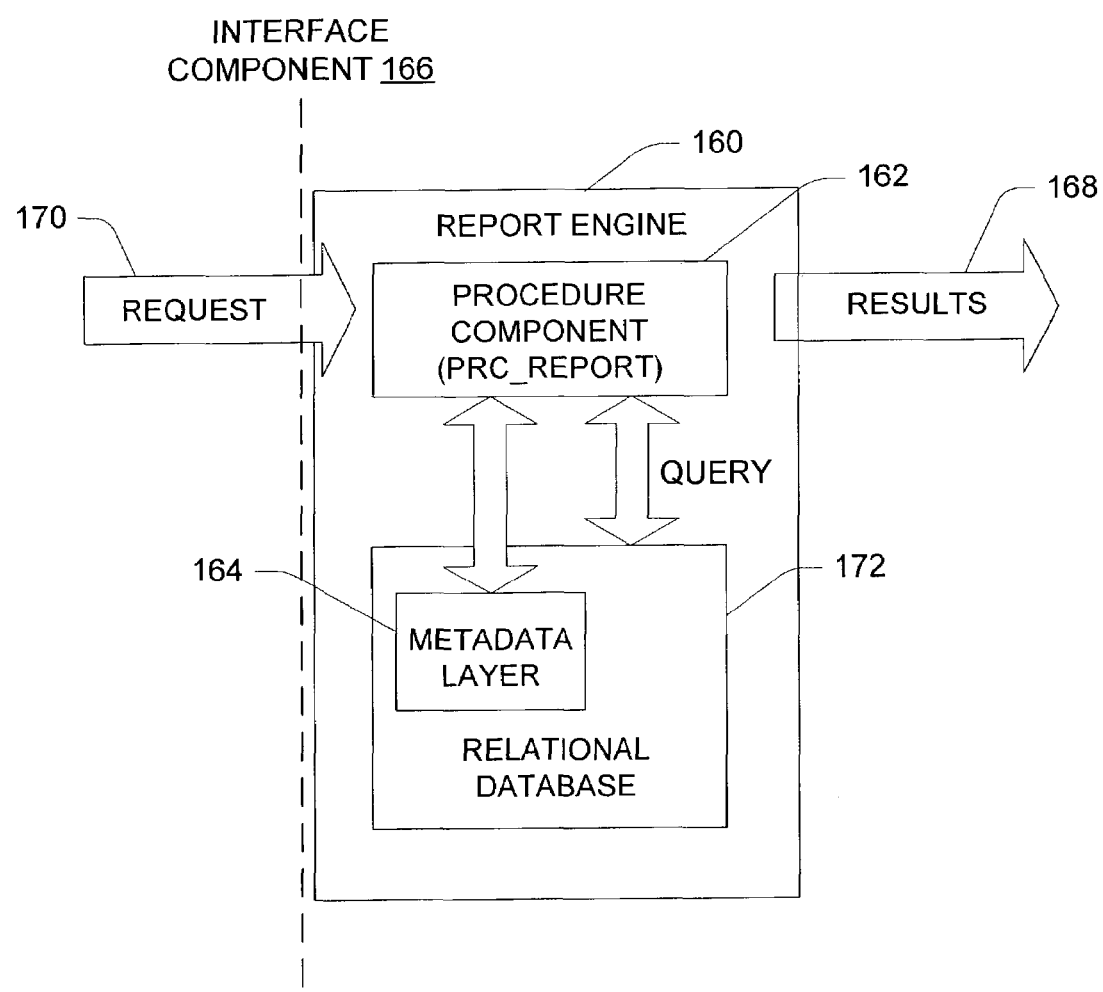
FIG. 1 is a block diagram illustrating a reporting engine according to one embodiment of the present invention.

Referring now to the drawings, FIG. 1 illustrates a reporting engine 160 in block diagram form. In one embodiment, computer-executable instructions implement the reporting engine 160, which includes a predefined procedure component 162, a metadata component, or layer, 164, and an interface component 166 (see FIG. 2). Reporting engine 160 generates a report at 168 in response to a request received at 170 for selected data to be retrieved from, for example, a relational database 172.

As described above, data warehouses store vast amounts of data in relational tables summarized at different levels to improve query performance. Although the database 172 is shown in FIG. 1 as a single storage unit for convenience, it is to be understood that in other embodiments of the invention, database 172 may be one or more memories contained within or separate from an associated server computer (not shown), which executes procedure component 162. Moreover, it is to be understood that the metadata layer 164 may be maintained separately or together with the data to be searched in database 172. Conventionally, queries are answered through reports generated from, for example, structured query language (SQL) statements that need to be heavily customized as new report requirements arise. Those skilled in the art are familiar with the use of SQL statements or strings to define SQL commands typically used in queries and aggregate functions.

The reporting engine 160 greatly reduces the need for customized code and the development time needed to expose data warehouse relational data in a flexible and generic manner. Thus, the invention makes existing data in relational tables more accessible to ad hoc queries. This occurs through a simplified interface without sacrificing performance. In one embodiment, reporting engine 160 has three main parts, i.e., the metadata layer 164, the interface 166 embodying simplified query syntax, and the procedure component 162.

As an example, database 172 represents an exemplary data warehouse containing data relating to Web usage for a plurality of services. The data has several dimensions, such as a Web site visitor's geographic location, client information (e.g., client device processor, operating system, and browser), the time of day at which the visitor accessed a particular Web page, the route taken through the site, and the like. In this particular example, the data warehouse may be modeled according to a star dimensional model schema in which a set of facts is surrounded by multiple dimensions, which describe the facts.

Referring now to procedure component 162, represented in FIG. 1 by a predefined, stored procedure, prc_report, reporting engine 160 returns a result set at 168 that matches the user-specified format and search conditions, as indicated at 170. For example, a user may be interested in Web usage information regarding hits on a particular Web page referred from a banner advertisement during a specified period time. According to aspects of the present invention, reporting engine 160 provides a relatively simple way to access data stored in multiple relational tables without specifically knowing their relationships and without typing complex customized SQL statements.

The metadata in metadata layer 164 describes the data in relational database 172 according to one or more of its characteristics, such as its data type. For instance, metadata layer 164 includes entities and SQL views describing the related dimensions, attributes, measures, and/or facts in the data warehouse (i.e., database 172). As used herein, an attribute is a descriptive characteristic of one or more levels representing logical groupings that enable end users to select data based on like characteristics. In other words, an attribute is a fact describing each value of a dimension. In relational modeling, for example, an attribute is a characteristic of an entity. Further to this example, an attribute may be a column in a dimension that characterizes elements of a single level. A measure is a numeric value stored in a fact table or cube.

Metadata layer 164 further automatically populates metadata associated with the data in database 172 through the SQL views. Those skilled in the art will recognize a SQL view as analogous to a virtual table or a stored query. The data accessible through a view is not stored in the database as a distinct object. Instead, the database stores a SELECT statement and the result of the SELECT statement forms the virtual table returned by the view. According to one embodiment, the user can use this virtual table by referencing the view name in Transact-SQL statements, for example, the same way a table would be referenced. The present invention advantageously provides for the creation of SQL views on top of the dimension and fact tables. The SQL views, through the metadata derived from them, make it possible for embodiments of this invention to mechanically compose SQL statements in a report engine window that displays the SQL statement for the current query or is used to create a SQL-specific query.

To extract information out of database 172, procedure component 162 first accepts inputs from the user at 170 according to the query syntax of interface 166. In turn, procedure component 162 takes the inputs, matches them with metadata layer 164, and constructs a set of SQL statements to retrieve data from database 172 in an efficient manner (e.g., the most efficient believed possible based on the the smallest fact table that contains all attributes and the most measures). When reporting engine 160 receives a request for information to be retrieved from database 172, it uses the metadata to obtain a list of facts that could possibly answer the query and selects the applicable fact table having the smallest estimated size. Procedure component 162 then constructs a query (e.g., one or more SQL statements) based on the fact table's SQL view, runs the query, and returns the result in the form of a report.

Referring further to metadata layer 164 of FIG. 1, the invention defines the metadata in one embodiment according to five main steps. First, computer-executable instructions implement, for example, a SQL view for each table that is to be exposed as a dimension. For each fact, computer-executable instructions create a fact view that exposes all attributes and measures for querying. This embodiment of the invention then imports a schema from, for example, the SQL catalog to populate the metadata tables. Defining measures and associating them to applicable facts continues the process of defining metadata. In addition, embodiments of the invention advantageously determine the estimated size of the fact tables organized by metadata layer 164.

Figure 2:
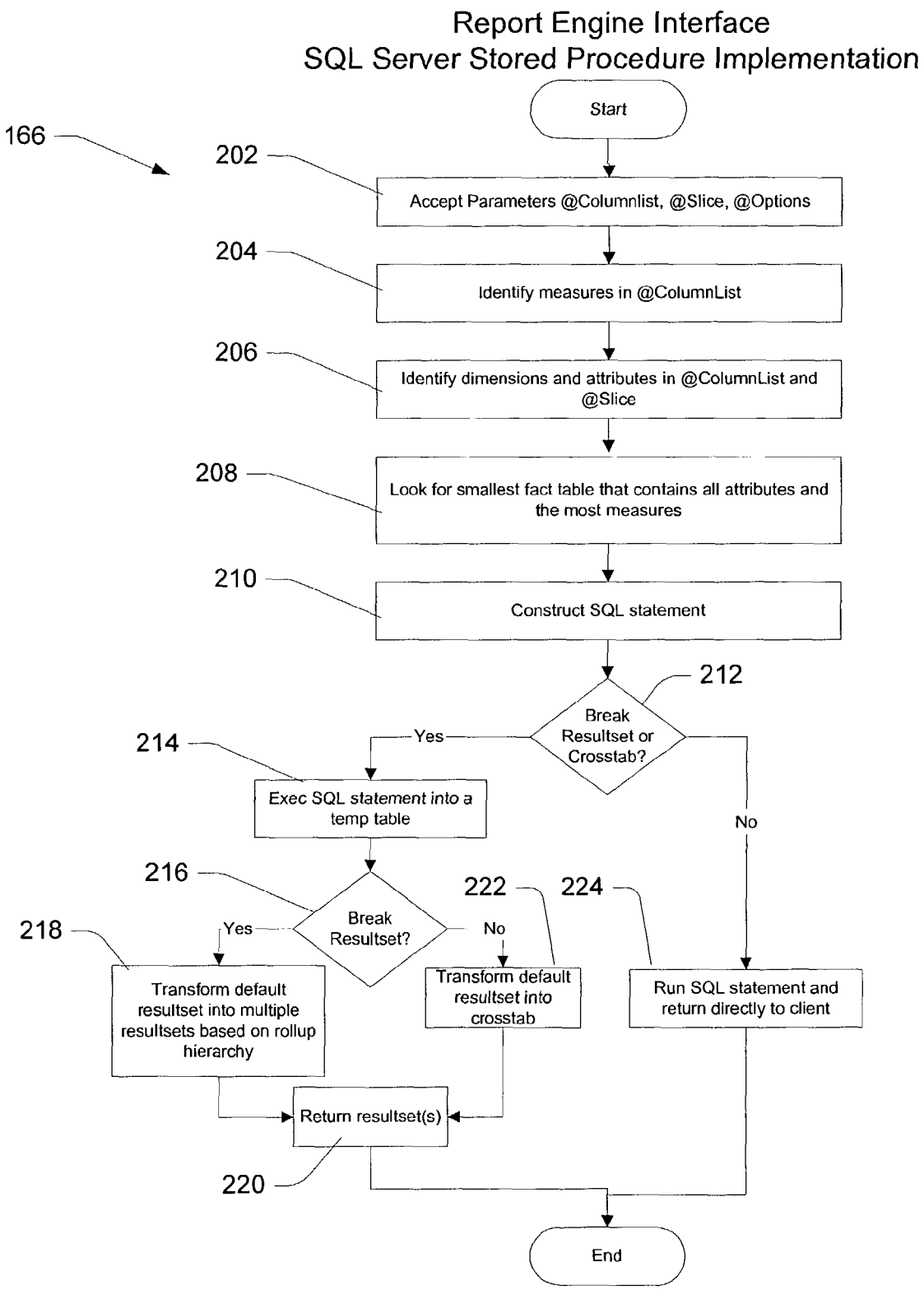
FIG. 2 is a flow diagram illustrating an exemplary interface for the reporting engine of FIG. 1.

Referring now to FIG. 2, an exemplary flow diagram illustrates aspects of reporting engine 160 including interface component 166. In one embodiment, the invention defines a query syntax according to the following:

prc_report
[@columnlist=] '{attribute|dimension:{*|{attribute [, ... n]}} [; ... n]} [; {measure [; ... n]} ]'
[, [@slice=] '[{attribute condition} [; ... n]]' ]
[, [@facttype=] 'facttype']
[, [@crosstabcolumns=] '[attribute:measure]' ]
[, [@sortorder=] '[{attribute [asc|desc] [; ... n]}]'
[, [@options=] '[{debug|rollup|rollup;breakresultset|rollup;breakresultset;showtoprollup|showtoprollup|nosort|top 1000} [; ... n]]' ]

Beginning at 202, the invention in this embodiment accepts parameters (e.g., @Columnlist, @Slice, @Options) specified by the user. In this example, @Columnlist is a list of dimension attributes (e.g., date, advertiser, service) and measures (e.g., clicks, impressions). The complete lists of available dimension attributes and measures are maintained in the ui_dimensionattribute and ui_measure tables (see FIG. 3). The column list parameter in one embodiment is semi-colon delimited but the list of attributes selected for a dimension may be comma-delimited if the dimension:attributelist syntax is chosen. The dimension:attributelist syntax is useful when the user wants to aggregate at the dimension level and then show the attributes of the dimension after performing the aggregation. This can substantially improve performance because procedure component 162, prc_report, will not have to perform unnecessary "group by's" and rollups. Those skilled in the art will recognize GROUP BY as a clause in a SQL SELECT statement commonly used to produce aggregate values for each row in a result set. ROLLUP generates a result set showing aggregates for a hierarchy of values in the selected columns.

The slice parameter in FIG. 2 represents a collection of search conditions in a list also delimited by semi-colon. In the illustrated example, only the rows that match all search conditions will be returned. While each search condition should begin with the attribute, it is possible to construct more complex search conditions that can be directly accepted by a SQL server query engine.

Further to the example, the options parameter specifies options, such as debug, nosort, top 1000, rollup, breakresultset, showtoprollup, and the like. The debug option returns the SQL statements dynamically created to answer the report request. The nosort option suppresses the default sorting behavior and can be used to improve performance. The top 1000 option returns only the top 1000 rows of data. In the alternative, the 1000 row limit may be hard-coded. The rollup, breakresultset and showtoprollup options are mainly used by the reporting middle-tier to allow hierarchical navigation on the user interface. At 204, the invention identifies the measures in the column list parameter and, at 206, identifies the dimensions and attributes in the column list and slice parameters. Use of the parameters in specifying the nature of the request permits the user to efficiently change report requirements at the back end without rewriting complicated stored procedures. Proceeding to 208, the example seeks to identify the smallest fact table (as indicated by the metadata) that contains all attributes and the most measures. The SQL statement implementing the query is constructed at 210.

Referring further to FIG. 2, at 212 the invention in the illustrated embodiment begins examining the other parameters specified by the user's request for information. Without the use of the result set or crosstab options, report engine 160 returns only one result set, which is the default result set. At 212, if either result set or crosstab options are selected, report engine 160 executes the SQL statement into a temporary table at 214. At 216, report engine 160 determines whether to proceed with a non-default result set according to the result set option or the crosstab option. Proceeding to 218, this embodiment transforms the default resultset into multiple result sets (i.e., breaks the result set) based on a rollup hierarchy and then return the result set at 220. On the other hand, report engine 160 transforms the default result set into crosstab at 222 and then returns it at 220. Operations continue at 224 for running the SQL statement and returning the default result set directly to the client.

If the rollup option is used, the result set will have rollup rows as returned by SQL server's ROLLUP operator. According to one embodiment of the invention, the breakresultset option is used together with the rollup option. If this option is used, prc_report returns the default result set and one separate result set for each rollup level, except the topmost level. If the showtoprollup option is used together with the breakresultset option, then prc_report also returns the rollup for the topmost level. On the other hand, if the showtoprollup option is used without breakresultset, then prc_report return the default result set and also the rollup for the topmost level.

According to the invention, one embodiment of the prc_report follows a SQL query template and makes substitutions as needed. An exemplary query template is described below:

select <outerattributelist> <outermeasurelist>
<into temp>
from (
   select <innerattributelist> <innermeasurelist>
   from dbo.<fact>
   <slice>
   <group by> <innerattributelist>
   <rollup>) f
<joinlist>
<sortorder>

The template in this embodiment consists of an inner SELECT statement and an outer SELECT statement. The inner SELECT statement is based on the fact view determined to be most efficient selected by the report procedure. The procedure substitutes all of the attributes, measures, and search conditions (e.g., <slice>), and then sends the preliminary result to the outer SELECT statement, which controls the sort order. However, a main function of the outer SELECT statement is to answer a request for aggregation at the dimension level and then returning one or more attributes of that dimension. In prc_report, this request is accomplished through the "dimension:{*|attribute [, ... n]}" syntax of the column list parameter (i.e., @columnlist).

The report engine 160 may also employ other parameters. For example, a fact type parameter lets prc_report limit its search of facts to a specific group. If the fact type parameter is empty, prc_report uses all available facts. Using a crosstab columns parameter transforms the default result set into a crosstab result set. The values of "attribute" become column headers and the values of "measure" display under the appropriate attribute value. The crosstab columns parameter cannot be used with the rollup option in one embodiment of the invention. If the attribute also exists in the slice parameter in the format:

attribute in ('value 1', 'value 2', . . . , 'value n')

then ALL values in the IN list will appear as column headers in the same order as listed in the slice. This means that even if the default result set does not contain a single row that matches a specified value in the slice, the crosstab result set still shows the specified value. In one embodiment, procedure component 162 allows only one attribute and one measure for crosstab functionality. Yet another parameter, sort order, overrides the default sort order, which is ascending order of attributes from left to right.

Figure 3:
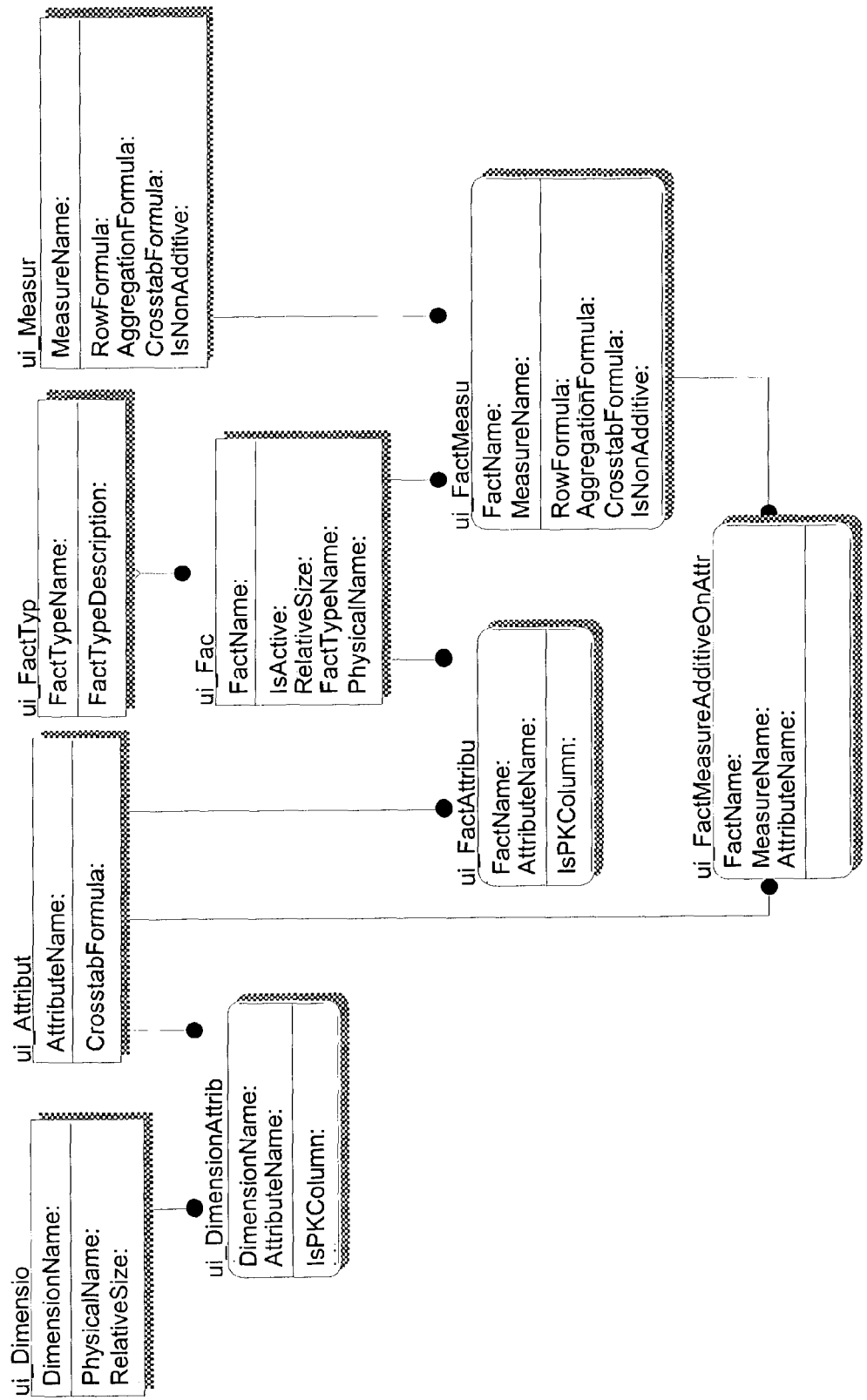
FIG. 3 is a block diagram illustrating an exemplary reporting engine metadata reporting framework embodying aspects of the present invention.

FIG. 3 is a block diagram illustrating an exemplary reporting engine metadata reporting framework embodying aspects of the present invention. As described above, the ui_dimensionattribute and ui_measure tables maintain the complete list of available dimension attributes and measures. Those skilled in the art will recognize a fact table usually has two types of columns, namely, those that contain facts and those that are foreign keys to dimension tables. The primary key of a fact table is usually a composite key that is made up of all of its foreign keys. A fact table might contain either detail level facts or facts that have been aggregated (fact tables that contain aggregated facts are often instead called summary tables). A fact table usually contains facts with the same level of aggregation. Fact and measure are analogous where fact is more commonly used with relational environments and measure is more commonly used with multidimensional environments. Those skilled in the art will also recognize that entities are used in database modeling whereas facts usually map to tables in relational databases.

Some systems implement this data model from within a relational database. A relational database has many interrelating tables. As known in the art, each table has a two dimensional structure of values with records and fields. A table can have a combination of one or more fields called the primary key. This means that for each record, the values in the fields of the primary key serve to identify the record. The value in each field of the primary key is known as a primary key identifier (PKID). A given PKID should be unique in a table; that is, no two records should have the same PKID.

Tables in a relational database are related by means of foreign keys. A foreign key is a combination of one or more fields. Each foreign key relates to a primary key of another table. A record in a table with a foreign key relates to a record in a table with a primary key if the fields in the foreign key have the same values as the fields in the primary key. In addition, there are defined relationships between the dimension and fact tables.

FIG. 4 shows one example of a general purpose computing device in the form of a computer 70. In one embodiment of the invention, a computer such as the computer 70 is suitable for use in executing the routines described herein.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 4 illustrates operating system 84, application programs 86, other program modules 88, and program data 90.

The computer 70 may also include other removable/non-removable, volatile/nonvolatile computer storage media. For example, FIG. 4 illustrates a hard disk drive 94 that reads from or writes to non-removable, nonvolatile magnetic media. FIG. 4 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 4, provide storage of computer readable instructions, data structures, program modules and other data for the computer 70. In FIG. 4, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 4 include a local area network (LAN) 136 and a wide area network (WAN) 138, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 4 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including mobile phones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those described herein for constructing a query and generating a customized report from relational data stored in a database. Metadata associated with the data in the database describes the data according to one or more characteristics of the data. In this embodiment, tables are defined for organizing the metadata relative to the data. One or more of the tables is exposed as a dimension having at least one column of attributes. Computer 70 in this embodiment receives a request for information from a user, compares search criteria specified by the request to the metadata attributes, and executes a predefined procedure for retrieving selected data from database 172 in response to the request for information. The procedure constructs a query as a function of the characteristics of the data as described by the metadata for optimizing retrieval of the selected data. In one embodiment, the procedure generates a set of SQL statements as a function of the comparison between the search criteria and the metadata attributes for implementing the query to optimize retrieval of the selected data from the database.

Those skilled in the art will note that the order of execution or performance of the methods illustrated and described herein is not essential, unless otherwise specified. That is, the inventors contemplate that elements of the methods may be performed in any order, unless otherwise specified, and that the methods may include more or fewer elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of generating a customized report from relational data stored in a database, said method comprising:
   providing metadata associated with the data in the database, said metadata describing the data according to one or more characteristics of the data, said metadata being associated with one or more attributes and measures;
   defining a plurality of tables according to the characteristics of the data in the database as described by the metadata;
   estimating a size of each of the defined tables;
   receiving a request for information from a user, said request specifying search criteria, said search criteria specifying at least one of said one or more attributes and measures; and
   executing a predefined procedure for comparing the search criteria specified by the received request to the metadata and identifying at least one of the defined tables containing data described by metadata associated with substantially all of the attributes and the greatest number of measures specified in the search criteria, said procedure further constructing a query based on the identified at least one of the defined tables having the smallest estimated size, said query retrieving selected data from the at least one of the defined tables having the smallest estimated size in response to the request for information as a function of the characteristics of the data as described by the metadata for optimizing retrieval of the selected data.

2. The method of claim 1, further comprising generating the report in response to the query, said report including the selected data retrieved from the database when the procedure is executed.

3. The method of claim 1, wherein the request from the user specifies a format for the report, search criteria, or both.

4. The method of claim 1, further comprising defining a plurality of tables for organizing the metadata relative to the data in the database.

5. The method of claim 4, wherein one or more of the tables is exposed as a dimension having one or more columns of attributes.

6. The method of claim 5, further comprising creating a structured query language (SQL) view for each of the tables to be exposed as a dimension.

7. The method of claim 4, further comprising creating, for each fact, a fact view to expose attributes and measures for querying.

8. The method of claim 4, wherein each table contains metadata associated with one of the following: an attribute; a dimension; a measure; or a fact.

9. The method of claim 1, wherein executing the predefined procedure to construct the query includes matching the metadata to search criteria in the request for information.

10. The method of claim 1, wherein the query constructed by the predefined procedure comprises one or more SQL statements.

11. The method of claim 1, wherein providing the metadata further comprises defining measures and associating the defined measures to applicable facts.

12. The method of claim 1, further comprising generating a SQL view to display information relating to the query constructed by the predefined procedure.

13. The method of claim 1, further comprising defining a query syntax according to which the request for information specifies the search criteria for the selected data.

14. The method of claim 13, wherein the request for information according to the query syntax comprises one or more delimited lists.

15. The method of claim 13, wherein the request for information according to the query syntax includes a user-selected input representative of one or more of the following: a column list parameter; a slice parameter; a fact-type parameter; a crosstab result parameter; an options parameter; and a sort order parameter.

16. The method of claim 13, wherein the query syntax includes a user-selected input representative of a column list parameter and wherein the column list parameter comprises a delimited list of dimensions, measures, or both, said delimited list representing a type of data to be retrieved from the database in response to the query.

17. The method of claim 13, wherein the query syntax includes a user-selected input representative of a slice parameter and wherein the slice parameter specifies a date range search criteria.

18. The method of claim 13, wherein the query syntax includes a user-selected input representative of a slice parameter and wherein the slice parameter specifies a name search criteria.

19. The method of claim 13, wherein the query syntax includes a user-selected input representative of an options parameter and wherein the options parameter specifies one or more of the following: a debugging option; a non-sorting option; a row limiting option; and a hierarchical navigation option.

20. The method of claim 1, wherein the predefined procedure comprises a template for generating a set of SQL statements for implementing the query.

21. One or more computer-readable media have computer-executable instructions for performing the method of claim 1.

22. A method of constructing a query for retrieving selected data from a database in response to a request from a user for information, said method comprising:
- defining metadata to describe data in the database according to one or more characteristics of the data, said metadata being associated with one or more attributes and measures;
- defining a plurality of tables according to the characteristics of the data in the database as described by the metadata;
- estimating a size of each of the defined tables;
- comparing search criteria specified by the request for information to the metadata attributes, said search criteria specifying at least one of the one or more attributes and measures; and
- executing a predefined procedure in response to the request for information to identify at least one of the defined tables containing data described by metadata associated with substantially all of the attributes and the greatest number of measures specified in the search criteria, said procedure further generating a set of structured query language (SQL) statements based on the identified at least one of the defined tables having the smallest estimated size, said query retrieving selected data from the at least one of the identified tables having the smallest estimated size as a function of the characteristics of the data as described by the metadata to optimize retrieval of the selected data from the database.

23. The method of claim 22, further comprising generating the report in response to the query, said report including the selected data retrieved from the database when the procedure is executed.

24. The method of claim 22, further comprising creating a SQL view for each of the tables to be exposed as a dimension.

25. The method of claim 22, further comprising creating, for each fact, a fact view to expose attributes and measures for querying.

26. The method of claim 22, wherein each table contains metadata associated with one of the following: an attribute; a dimension; a measure; or a fact.

27. The method of claim 22, wherein defining the metadata further comprises defining measures and associating the defined measures to applicable facts.

28. The method of claim 22, further comprising generating a SQL view to display information relating to the query constructed by the predefined procedure.

29. The method of claim 22, further comprising defining a query syntax according to which the request for information identifies search criteria for the selected data.

30. The method of claim 29, wherein the request for information according to the query syntax comprises one or more user-selected parameters representing a type of data to be retrieved from the database in response to the query.

31. One or more computer-readable media have computer-executable instructions for performing the method of claim 22.

32. One or more computer-readable media having computer-executable components for generating a report from data stored in a database, said computer-readable media comprising:
- a metadata component for describing the data in the database according to one or more characteristics of the data, said metadata component further defining a plurality of tables according to the characteristics of the data in the database as described by the metadata, said metadata being associated with one or more attributes and measures, said metadata component further estimating a size of each of the defined tables;
- an interface component for receiving a request for information from a user, said request specifying search criteria, said search criteria specifying at least one of the one or more attributes and measures; and
- a procedure component responsive to the request for information for constructing a query to retrieve selected data from the database, said procedure component comparing the search criteria specified by the received request to the metadata and identifying at least one of the defined tables containing data described by metadata associated with substantially all of the attributes and the greatest number of measures specified in the search criteria, said procedure further constructing the query based on the identified at least one of the defined tables having the smallest estimated size, said query retrieving selected data from the database in response to the request for information as a function of the characteristics of the data as described by the metadata for optimizing retrieval of the selected data.

33. The computer-readable media of claim 32, wherein the request from the user specifies a format for the report, search criteria, or both.

34. The computer-readable media of claim 32, wherein the metadata component comprises a plurality of tables containing metadata, said tables organizing the metadata relative to the data in the database.

35. The computer-readable media of claim 34, wherein at least one of the tables is exposed as a dimension having one or more columns of attributes.

36. The computer-readable media of claim 35, wherein the metadata component includes a structured query language (SQL) view for each of the tables to be exposed as a dimension.

37. The computer-readable media of claim 36, wherein the metadata component automatically populates the metadata through the SQL view.

38. The computer-readable media of claim 34, wherein the metadata component includes, for each fact, a fact view to expose attributes and measures for querying.

39. The computer-readable media of claim 34, wherein each table contains metadata associated with one of the following: an attribute; a dimension; a measure; or a fact.

40. The computer-readable media of claim 32, wherein the query constructed by the procedure component comprises one or more SQL statements.

41. The computer-readable media of claim 32, wherein the interface component comprises a query syntax according to which the request for information identifies search criteria for the selected data.

42. The computer-readable media of claim 41, wherein the request for information according to the query syntax comprises one or more delimited lists.

43. The computer-readable media of claim 41, wherein the request for information according to the query syntax includes a user-selected input representative of one or more of the following: a column list parameter; a slice parameter; a fact-type parameter; a crosstab result parameter; an options parameter; and a sort order parameter.

44. The computer-readable media of claim 41, wherein the query syntax includes a user-selected input representative of a column list parameter and wherein the column list parameter comprises a delimited list of dimensions, measures, or both, representing a type of data to be retrieved from the database in response to the query.

45. The computer-readable media of claim 41, wherein the query syntax includes a user-selected input representative of a slice parameter and wherein the slice parameter specifies a date range search criteria.

46. The computer-readable media of claim 41, wherein the query syntax includes a user-selected input representative of a slice parameter and wherein the slice parameter specifies a name search criteria.

47. The computer-readable media of claim 41, wherein the query syntax includes a user-selected input representative of an options parameter and wherein the options parameter specifies one or more of the following: a debugging option; a non-sorting option; a row limiting option; and a hierarchical navigation option.

48. The computer-readable media of claim 32, wherein the procedure component comprises a predefined template for generating a set of SQL statements for implementing the query.

49. The computer-readable media of claim 32, wherein the interface component comprises an application programming interface.

* * * * *